J. T. MATTHEWS.
TRANSPLANTER.
APPLICATION FILED MAR. 7, 1912.

1,038,924.

Patented Sept. 17, 1912.

Witnesses
U. A. Williams
H. A. Pattison

Inventor
J. T. Matthews
By A. S. Pattison
Attorney

UNITED STATES PATENT OFFICE.

JAMES T. MATTHEWS, OF SAN ANTONIO, TEXAS.

TRANSPLANTER.

1,038,924.  Specification of Letters Patent.  Patented Sept. 17, 1912.

Application filed March 7, 1912. Serial No. 682,117.

*To all whom it may concern:*

Be it known that I, JAMES T. MATTHEWS, a citizen of the United States, residing at San Antonio, in the county of Bexar and State of Texas, have invented certain new and useful Improvements in Transplanters, of which the following is a specification, reference being had therein to the accompanying drawing.

My invention relates to improvements in transplanters, and one that is more particularly adapted for transplanting cotton.

The object of my invention is to provide a transplanter of this character, in which a greater amount of earth is removed and supported around the roots of the plant, and whereby the earth and plant can be readily released when desired.

Another object of my invention is to provide a more simple, cheap and effective transplanter of this character.

Figure 1:
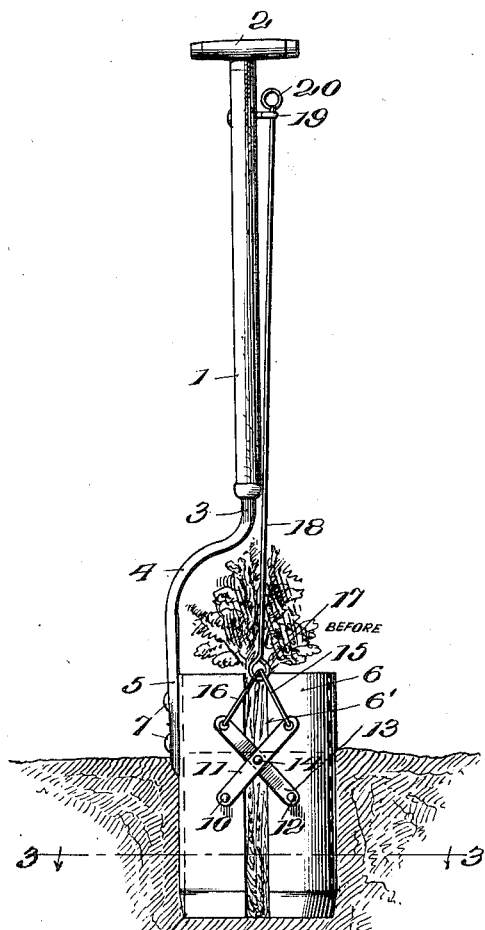
Figure 2:
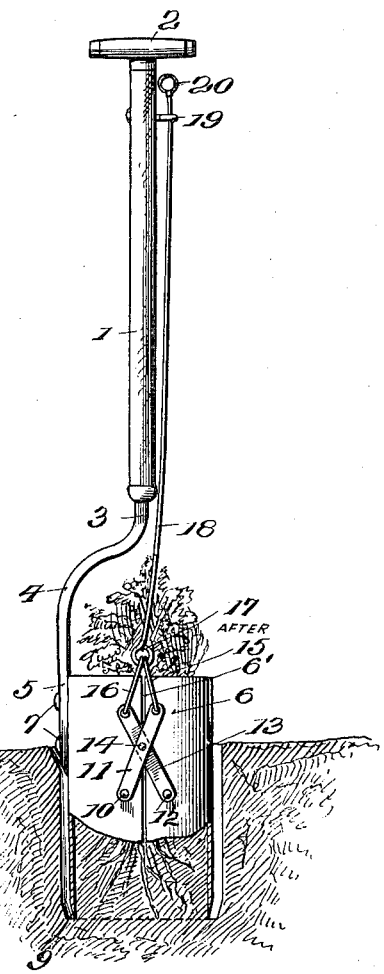
Figure 3:
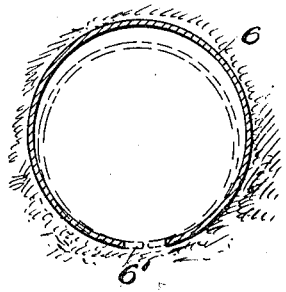

In the accompanying drawings: Figure 1 is a side elevation of my improved transplanter in an open position. Fig. 2 is a side elevation in the act of transplanting a plant. Fig. 3 is a transverse sectional view taken on the line 3—3 of Fig. 1.

Referring now to the drawings, 1 represents a handle which is preferably of wood, and having at is upper end the cross-bar 2, which may be readily varied without departing from the scope of my invention. The lower end of the handle 1 has rigidly secured thereto in any desired manner a steel bar 3, which is curved outwardly at 4, and has at its lower end a vertical portion 5. Secured to the said vertical portion 5 of the bar 3, is a vertical cylindrical member 6, which, as shown, is riveted at 7, although any other desired securing means could be employed. The said cylindrical member 6, at one side, is provided with a slit 6′, which, as shown, is in a line directly below the handle 1.

The cylindrical member 6 is composed of sheet steel or iron, and has its lower end sharpened at 9, so as to be readily forced into the ground, as will be hereinafter more fully described. The edges of the cylindrical member forming the slit are spaced some distance apart, so that the said cylindrical member may be compressed as will now be described. The cylindrical member 6 has pivotally connected thereto midway its length and adjacent one side of the slit 6′ at 10, a lazy tong lever 11. Pivotally connected to said cylindrical member at 12, on the opposite side of the slit, is a lazy tong lever 13, which crosses the lazy tong lever 11 and these levers are pivoted together at 14, intermediate their ends. The cylindrical member 6 being made of spring metal, as heretofore stated, will normally expand and assume the position shown in Fig. 1, and the upper ends of the lazy tong will be held apart. The upper ends of the lazy tong levers have connected thereto the short wires 15 and 16, which are connected to an eye 17, carried by the lower end of a rod or wire 18. The said rod or wire passes upwardly through guides 19, carried by the handle 1, and is provided at its upper end with a ring or hand-hold 20, whereby the rod may be operated.

The operation of the device is as follows: The cylindrical member is placed over the plant and forced down into the soil around the plant, either by pressure upon the handle, or foot pressure upon the upper end of the cylindrical member. After the same has been depressed into the soil a sufficient distance, the ring 20 is drawn upwardly, which in turn draws on the two short wires 15 and 16, and the upper end of the lazy tong levers 11 and 13 are drawn together, which necessarily draws the lower ends of the levers together and compresses the cylinder. The soil is thus firmly compressed within the cylindrical member and firmly held and the plant can be moved to the desired place.

In transplanting plants, for which my device is adapted, a hole is first dug with my transplanter into which the plant is to be placed. The transplanter supporting the plant being contracted can be readily placed in the hole previously dug and the release of the ring 20 will allow the cylindrical member to open or resume its expanded position. As above stated, the soil will drop by gravity therefrom and remain in its position around the roots of the plant, the device having firmly compressed the soil around the roots, as above described.

Having thus described my invention, what I claim and desire to secure by Letters Patent is:

1. A transplanter comprising a split cylindrical member, a handle carried thereby and lazy tong levers for contracting said cylindrical member.

2. A transplanter comprising a split cylindrical member, a handle carried thereby, pivoted lazy tong levers having their lower ends connected to the cylindrical member on opposite sides of the split portion, and means carried by the handle for operating said lazy tong levers.

3. A transplanter comprising a split cylindrical member, a handle carried thereby, lazy tong levers pivoted together intermediate their ends and having their lower ends connected to the cylindrical member on opposite sides of the slit, wires connected to the upper ends of the lazy tong levers and an operating rod carried by the handle and connected to said wires.

4. A transplanter comprising a split cylindrical member, a handle secured thereby, two lazy tong levers pivoted together intermediate their ends and having their lower ends pivoted to the cylindrical member on opposite side of the split portion, wires connected to the upper ends of the lazy tong levers, a rod connected to the upper ends of said wires and passing through guides carried by the handle, and an operating means connected to the upper end of the rod, whereby the lazy tongs are drawn together and the cylindrical member compressed.

5. A transplanter comprising a split cylindrical member, a handle secured to one side and having its upper end bent inwardly over the center of said cylindrical member, two lazy tong levers pivoted together intermediate their ends and having their lower ends pivoted to the cylindrical member on opposite sides of the split portion, wires connected to the upper ends of the said lazy tong levers, a ring connected to said wires, a rod connected to the said ring, and passing upwardly through guides carried by the handle and operating means connected to the upper end of the rod, whereby the lazy tongs are drawn together and the cylindrical member compressed.

In testimony whereof I hereunto affix my signature in the presence of two witnesses.

JAMES T. MATTHEWS.

Witnesses:
  VIOLA GIBSON,
  N. G. RAMBIE.